INVENTOR.
J. T. CABBAGE
BY Hudson and Young
ATTORNEYS

United States Patent Office 3,146,187
Patented Aug. 25, 1964

3,146,187
CATALYTIC HYDROGENATION OF BENZENE
John T. Cabbage, Bartlesville, Okla., assignor to Phillips Petroleum Company, a corporation of Delaware
Filed Apr. 24, 1961, Ser. No. 104,956
4 Claims. (Cl. 208—57)

This invention relates to catalytic hydrogenation. In one of its aspects, the invention relates to an improved hydrogenation operation in which a plurality of catalytic reactors is used and in which ordinarily a reactor spends considerable time on "stand-by," the invention providing that the effluent from a reactor be admixed with a secondary feed to accomplish a desirable concentration of hydrogenatable material in the admixture and feeding the admixture thus obtained through the reactor normally on stand-by. In another of its aspects, the invention provides apparatus so arranged that the method can be accomplished, the apparatus comprising, in combination, in addition to the usual means, means for feeding the secondary feed stream into admixture with a reactor effluent, means for feeding the admixture to a stand-by reactor, and means for processing the effluent from the stand-by reactor to provide the usual recycle diluent stream and recycle hydrogen stream, while removing from the operation the additional hydrogenated liquid resulting from a feeding of the secondary liquid feed stream or hydrogenatable material to the operation. In another of its aspects, the invention relates to a process for the preparation of a reformate, a benzene concentrate, and a hexane stream, containing cyclohexane, in a combination of interrelated steps advantageously utilizing streams becoming available in a hydrocarbon reforming and in a hydrogenation of benzene step.

Figure 1:
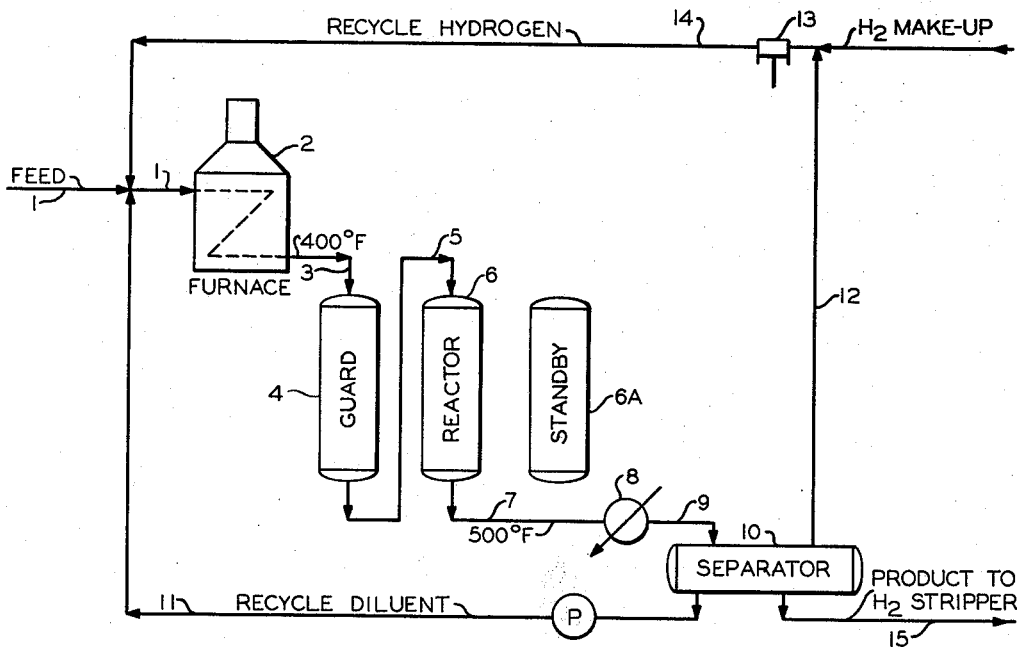
Figure 2:
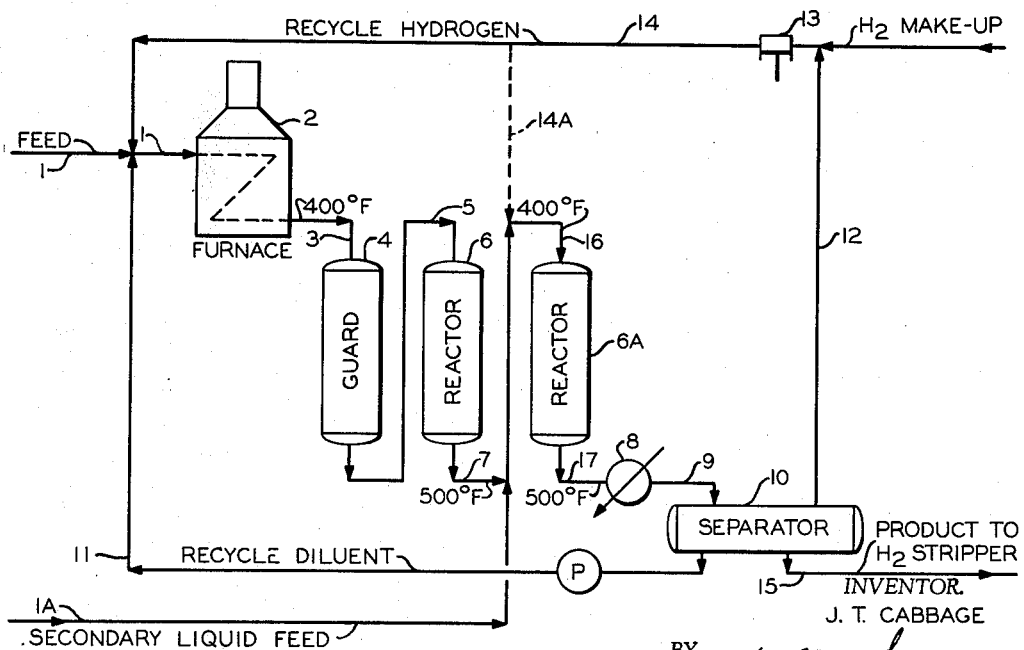
Figure 3:
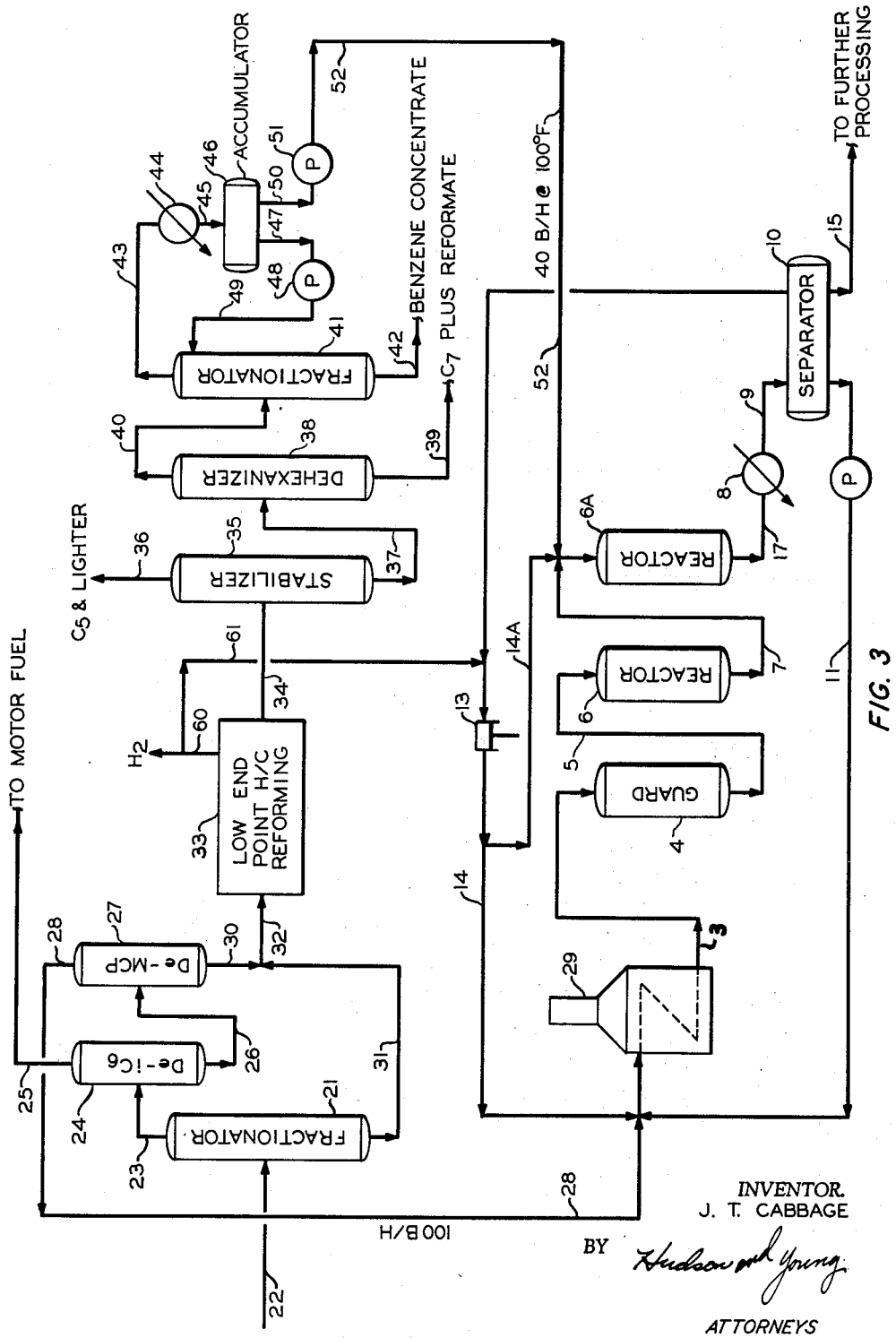

In the drawings, FIGURE 1 illustrates a conventional hydrogenation system in which there is used a guard chamber and in which there are two reactors, one of which is in service while the other is on stand-by. In FIGURE 2, there is shown a modification of the operation or system of FIGURE 1 according to the invention, that is, there are two different feeds to the unit. In FIGURE 3, there is shown an embodiment of the invention as it is applied to hydrogenation of benzene in a hexane isomerization feed derived from a hydrocarbon reforming operation with which the hydrogenation operation of the invention is suitably and advantageously combined.

In the prior art operation of a hydrogenation reaction system, there are certain limiting factors. One skilled in the art in possession of this disclosure, having studied the same, will understand that, when a catalyst is used, the inlet temperature shall be sufficiently elevated to induce proper reaction, to avoid spalling of catalyst due to impingement of liquid thereon, etc. Also, the reaction being exothermic, the total quantity of material entering the reactor must not contain more than that amount of hydrogenatable substance than will cause an acceptable temperature rise in the reactor. Thus, it is necessary to avoid cracking and consequent hydrogenation of the cracked products which will yield more heat of reaction which exceeds greatly the endothermicity of the cracking. For these and other reasons, the capacity of an existing system or unit is limited by factors, such as those here discussed. For example, in an operation disclosed herein, benzene content of a hexane feed to a reactor is limited to about 5 liquid volume percent.

In FIGURE 1, this feed 1 enters at one end of furnace 2, is heated therein to 400° F., is passed by 3 to guard chamber 4 and by 5 into reactor 6. An increase of 100° F. is experienced and hydrogenated stream is passed at 500° F. by 7 from the reactor through cooler 8 and by 9 into separator 10. From 10 recycle saturated feed (hexane and cyclohexane) is passed by 11 to 1 and into furnace 2 and, thence, to chambers 4 and 6 as already described. Hydrogen passes from 10 by 12 and compressor 13 and by 14 to 1 and furnace 2. Reactor 6A is, according to present practice, on "stand-by," i.e., it is not being utilized.

Thus, in FIGURE 1, the conventional system has the last reactor on "stand-by," to be placed on stream when the in-use reactor is spent. It takes about 20 days to oxidize, unload, refill with, and reduce the catalyst. A reactor, as here discussed, is on stream as a reactor about 90 days (and then an additional 90 days as a guard chamber). Hence, there are 70 days of idle time on this stand-by unit which is used by my invention, which time is now lost entirely.

It has now been conceived by me that by taking a feed of hydrogenatable material containing (to use the example already under discussion) 30 liquid volume percent benzene and admixing this stream, as later described, with the reactor 6 effluent and passing this stream into the stand-by reactor during the time it ordinarily is not in use (70 days in above example), I can increase the total capacity of the system and, indeed, can more than double its hydrogenation capacity as it stands.

Thus, referring now to FIGURE 2 which basically is FIGURE 1 but in which it will be seen there are a few changes, the reacted stream 7 instead of being passed to 10 and by-passing 6A is admixed with secondary liquid feed 1A at a temperature such that, upon admixture to the total of stream 7 and 1A at 16, will be about 400° F. This newly-formed stream now is passed through reactor 6A and from 6A by 17 to cooler 8 and by 9 to separator 10. Recycle hydrogen is passed by 14A into stream 16 at a proper temperature and in a proper ratio to accomplish the 6A reactor hydrogenation. In both FIGURES 1 and 2, product is removed at 15 in respective amounts such that recycle in 11 will be the desired proper amount.

It will be seen from this disclosure that, although the same concentration of benzene or other hydrogenatable material can be injected at the entry of the second reactor, as is provided at the entry of the first reactor, a lesser concentration of benzene in the feed at the second reactor entry can still increase substantially the capacity of the unit by using the "stand-by" reactor during the time it ordinarily has been standing idle. Several reactors can thus be lined up according to the invention.

Thus, an object of the invention is to provide a novel hydrogenation process. Another object of the invention is to provide a novel hydrogenation apparatus.

Another object is to provide an increase of the capacity of an existing hydrogenation unit or system in which so-called "swing reactors" are used. It is a further object of the invention to provide a novel manner of quenching a reactor effluent in a hydrogenation system. It is a further object of the invention to provide a novel manner of regulating hydrogenation in a stream passing serially through several reactors in a system. A still further object of the invention is to provide a manner of utilizing pure hydrogenatable material to increase the purity of the final hydrogenated product. In a further object still, the invention utilizes a stream having a high concentration of hydrogenatable material therein without urging the operation beyond desirable temperature limits. In a still further object, a novel manner of operating a hydrogenation reactor system is provided. A still further object is a novel hydrogenation of hydrogenatable hydrocarbons and other materials, e.g., benzene, to produce increased yields of cyclohexane. A still further object is to utilize available reformate cuts as a feed stream to hydrogenation for increasing cyclohexane production without appreciably increasing required equipment and operating expense.

Other aspects, objects and the several advantages of this invention are apparent from a study of this disclosure, the drawings and the appended claims.

According to the present invention, in a so-called swing reaction zone system in which ordinarily there is a stand-by zone and in which from a hydrogenation zone there is obtained a hydrogenated stream, there is admixed with said hydrogenated stream a cooler secondary liquid feed containing hydrogenatable material in a quantity such that, upon admixture, the final stream contains not more than a desired concentration of hydrogenatable material at a temperature such that it can be suitably and is, therefore, passed to the stand-by reactor during such a time that the stand-by reactor ordinarily, in the prior art, has remained on stand-by. Further, according to the invention, there is combined with a reforming of hydrocarbons an operation as previously described, according to the invention, to effectively utilize a hydrogen stream and a benzene-containing stream from the reforming operation in the said operation previously described.

Referring now to FIGURE 3, hydrocarbon feed enters fractionator 21 by way of 22. In fractionator 21 the hydrocarbon feed is essentially split into two fractions. An overhead fraction passes by 23 to deisohexanizer 24. In deisohexanizer 24 an overhead suitable for use as at least a component of motor fuel is removed by 25. Bottoms from 24, containing $C_6$ and heavier hydrocarbons, are passed by 26 to demethylcyclopentanizer 27, overhead from which consisting essentially of $C_6$ hydrocarbons passes by 28 to furnace 29. Bottoms from 27 pass by 30 and together with bottoms from 21 removed from 21 by 31 pass together by 32 into low end point hydrocarbon reforming zone 33. In zone 33 hydrocarbons are reformed under conditions conventional in the art to provide a reformate suitable for use in blending of gasolines. This reformate cut 39 contains approximately 7 to approximately 10 carbon atoms per molecule. Also, there is obtained, due to the reforming, benzene. Thus, effluent from 33 passes by 34 to stabilizer 35, overhead from which consists essentially of $C_5$ and lighter hydrocarbons taken off at 36. Bottoms pass by 37 to dehexanizer 38 wherein bottoms constitute the $C_7+$ reformate, earlier mentioned, which is removed by 39. Overhead from 38 passes by 40 to fractionator 41, bottoms from which are benzene concentrate removed by 42. This concentrate can contain as high as of about the order of 40 percent benzene. Overhead taken off column 41 at 43 passes by cooler 44, 45, into accumulator 46. Liquid is withdrawn from accumulator 46 and passed, in part, to column 41 for reflux by way of 47, pump 48 and 49. The remainder of the liquid from the accumulator passes by 50, pump 51 and 52 for use as the secondary feed or liquid of the invention, earlier discussed. Stream 52 contains, in this embodiment, approximately 30 percent benzene, 30 percent methylcyclopentane and 40 percent normal hexane. Vapor heated to 400° F. passes from furnace 29 by 3 to guard chamber 4, and, thence, by operation described in connection with FIGURE 2 through reactors 6 and 6A and ultimately to separator 10 as described in connection with the operation of FIGURE 2. It will be noted that the same numbers are used to describe FIGURE 3 as have been used to describe FIGURE 2.

Further, according to the embodiment of the invention here described, hydrogen obtained from low end point reforming zone 33 is passed therefrom by 60 and 61 to 14. Thus, in this embodiment of the invention, hydrogen obtained in the reforming zone provides at least a portion of the hydrogen required for the reaction in the ordinarily on stand-by but now used reactor 6A.

Upon consideration of FIGURE 3, it will be noted that there is provided a unitary operation in which a single hydrocarbon feed stream 22 is treated to obtain by way of a combination of interrelated steps not only an improved operation which makes use of stand-by reactor 6A but also the secondary feed stream for reactor 6A as well as hydrogen while, at the same time, obtaining $C_7+$ reformate and the benzene concentrate removed by 39 and 42, respectively, as well as a $C_6$ cut suitable for further isomerization. The interrelationship between fractionator 21 and fractionator 27 to provide the feed stream for furnace 29, while, at the same time, providing through composition of the streams 31 and 30 the stream 32 for reforming which results after several additional steps in stream 52, will also be noted.

In the foregoing drawing, in the hydrogenation system, benzene in the essentially hexanes feed is hydrogenated to cyclohexane employing a supported nickel catalyst. This catalyst is well known in the art. Generally, the quantity of hydrogen required is about at least 9 mols of hydrogen per mol of benzene in the feed or a minimum hydrogen partial pressure at the reactor outlet of approximately 75 to 80 p.s.i.a., whichever is limiting. Feed to the hydrogenation reactions must be vaporous, otherwise the catalyst will spall as earlier discussed. The minimum temperature for all vapor feed is approximately 400° F. for the type of hexanes feed at the existing hydrogen pressures used.

Hydrogenation (of benzene) is exothermic with about 1200 B.t.u.'s per pound of benzene hydrogenated giving a rise in temperature across the reaction zone of about 20° F. per each liquid volume percent of benzene in the total feed to the hydrogenation step. A 5 percent benzene content will cause about 100° F. rise across the reactor with the above-stated conditions. The upper temperature limit for the process is about 500° F., limited by cracking and subsequent hydrogenation of the cracked products which causes run-away temperature increases. With the reactor outlet temperature limited by demethylation and the inlet set by dew point (must be vapor feed), the percent benzene in the feed is limited at about 5 liquid volume percent at maximum. The hydrogenation is completed in a relative shallow depth of active catalyst, and the reaction front moves slowly through the reactors as catalyst becomes deactivated. Hence, space velocity is relatively unimportant to this hydrogenation type operation.

As noted, the quantity of benzene which can be hydrogenated is limited to the above 5 liquid volume percent of the total feed (liquid) to the reaction system. The total feed (liquid) is limited by the capacity of the recycle (benzene-free) diluent, fresh feed pumps, and capacity of the heater.

To further illustrate the invention, assume that the fresh feed contains 10 liquid volume percent benzene, and that the pumping capacity and heating capacity limits the fresh feed to 100 barrels per hour.

|  | Total, B./hr. | Benzene | |
| --- | --- | --- | --- |
|  |  | B./hr. | Mol/hr. |
| Fresh Feed (28) | 100 | 10 | 39.7 |
| Recycle Diluent (11) | 100 | 0 | 0 |
| Total | 200 | 10 | 39.7 |

The heat of reaction is:

$39.7 \times 78.1 \times 1200 = 3,720,000$ B.t.u./hr.

This invention, which effects a reaction in both of the reactors with intermediate cooling of the first reactor effluent vapor from 500° F. down to 400° F. by injecting thereinto a secondary benzene-containing liquid stream, along with the hydrogen required to maintain reaction conditions, employs, as an example, an available stream (see FIGURE 2 or 3) at 100° F. containing 30 liquid volume percent benzene from the low end point reformer.

Component:                                 L.V. percent
    Benzene _____ 30
    Normal hexane _____ 40
    Methyl cyclopentane _____ 30

Total _____ 100

This stream contains 1.19 mols of benzene per barrel of secondary liquid feed 52 requiring a total of 10.7 mols $H_2$ per barrel (at 9:1 mol ratio of hydrogen to benzene), 4.7 mols $H_2$/barrel being added by way of line 14A, or a total of 191 mols of hydrogen added via 14A. Introducing at 100° F. 20 barrels of liquid secondary feed per 100 barrels of primary feed will cool the reactor effluent from 500 to 400° F. as needed. In my described operation, using 100 barrels/hour fresh feed and 100 barrels per hour recycle diluent, I charge 40 barrels per hour of this secondary liquid feed, giving 240 barrels per hour feed to the final reactor. This feed to the final reactor will contain the desired 5 liquid volume percent benzene. And this quantity of benzene will give the desired 100° F. rise through this last reactor, as desired.

My operation has, therefore, more than doubled the capacity of a given system to hydrogenate benzene.

In an embodiment not shown, in order to insure complete vaporization of the feed to the final reactor, a liquid-vapor separator is installed between the final reactor inlet and the liquid feed injection point to remove any non-vaporized portion of the mixture.

*Table*

| | Rate |
|---|---|
| Fresh feed (vapor) 28, rate as liquid (benzene, vol. percent—10) | 100 b./hr. |
| Recycle diluent 11 (benzene, vol. percent—nil) | 100 b./hr. |
| Hydrogen 14 | 357 mols/hr. |
| Secondary feed (liquid) 52 | 40 b./hr. |
| (Benzene, vol. percent—30) | |
| (Normal hexane, vol. percent—40) | |
| (Methylcyclopentane, vol. percent—30) | |
| Hydrogen 14A | 191 mols/hr. |
| Charge to furnace 29: | |
| Hydrocarbon (benzene, vol. percent—5) or 39.7 mols/hr | 200 b./hr. |
| Hydrogen | 357 mols/hr. |
| Reactor temperature, ° F.: | |
| Inlet | 400 |
| Outlet | 500 |
| Total benzene to cyclohexane, b./hr. | [1] 22 |

[1] Compare to 10 b./hr. conventionally produced.

As can be seen, when operating according to my invention, using a series of hydrogenation zones, each additional reaction zone used approximately increases the system's capacity arithmetically. That is, one reaction zone produced 10 barrels per hour cyclohexane, the next reaction zone added 12 additional barrels per hour cyclohexane, etc. This is an approach to an arithmetic increase in capacity with each added reaction zone.

Reasonable variation and modification are possible within the scope of the foregoing disclosure, the drawings, and the appended claims to the invention the essence of which is that there have been provided method and apparatus for effecting an improved hydrogenation wherein an ordinarily on "stand-by" reactor is used to increase the capacity for hydrogenation of an existing unit by admixing the effluent from a first reactor with a secondary feed which quenches the effluent down to a temperature at which further hydrogenation can be catalytically conducted while the effluent dilutes the secondary feed so that the proportion of hydrogenatable material therein is not so great as to adversely affect hydrogenating conditions by liberation of undesired excess of exothermic heat, in one embodiment the method and apparatus including an overall operation in which a single feed stream is separated into at least a low end point hydrocarbon suitable for reforming which is reformed, yielding a $C_7+$ reformate and a benzene concentrate, as products of the process, and a benzene-containing fraction, the said single feed being also so fractionated as to obtain a stream containing essentially $C_6$ hydrocarbons and benzene, the latter stream being combined with the benzene-containing stream, by an operation according to the invention by hydrogenating the $C_6$ containing stream and then combining the benzene-containing stream with the effluent from such a hydrogenation; the apparatus comprising means for passing a secondary liquid feed into a stand-by reactor, all substantially described.

I claim:

1. A method of treating a petroleum fraction containing $C_6$ and higher boiling hydrocarbons suitable for low end point reforming which comprises passing said fraction to a separation zone, in said zone separating as an overhead a stream containing isohexane, methylcyclopentane, cyclohexane and benzene and as a higher boiling material the stream containing hydrocarbons generally higher boiling than $C_6$ hydrocarbons, passing the higher boiling material to a low end point hydrocarbon reforming zone, fractionating said overhead stream to remove therefrom isohexane separated as a product, fractionating the remainder of said overhead stream to remove therefrom a benzene-containing overhead, passing the remainder of said overhead stream to said reforming zone, obtaining a reformed effluent stream from said reforming zone, removing from said effluent stream a benzene-containing fraction; hydrogenating in a first hydrogenation zone said benzene-containing overhead, obtaining a hydrogenated effluent, admixing said hydrogenated effluent with said benzene-containing fraction at a temperature and in an amount such that the admixture will be at a temperature and at a benzene concentration sufficiently low that, upon subsequent hydrogenation, the exothermicity of the reaction will yield only that amount of heat that a temperature beyond which undesired reactions will occur will not be exceeded and passing said admixture into and through a second hydrogenation zone under conditions to cause hydrogenation of benzene-containing fraction therein.

2. A method of operating a continuous hydrogenation system, wherein there are at least two swing catalytic reactors, one of which is on stand-by during a normal operation of the system while another reactor receives and processes the feed to the system which is as follows: a first reactor is employed to effect hydrogenation until it is no longer effective to yield desired hydrogenation, then the feed is switched into a second reactor which has not been used or spent in effecting hydrogenation and while the feed is passing into and through said second reactor, the employed first reactor is regenerated in a time which is substantially less than the time during which said second reactor remains effective to effect hydrogenation and then is placed on stand-by for the remainder of said time during which said second reactor remains effective to effect hydrogenation which comprises, during the remainder of said time said second reactor normally remains effective to effect hydrogenation, admixing with the effluent from said second reactor, normally used while said first reactor is on stand-by, a secondary hydrogenatable material containing feed at a temperature and in an amount and containing said hydrogenatable material in a concentration which, upon admixture, will yield a mixed stream having a temperature and concentration of hydrogenatable material such that, upon passing said mixed stream into said now stand-by first reactor, during the time it normally would be on stand-by, said mixed stream can be hydrogenated in said now ordinarily stand-by reactor without exceeding a temperature beyond which undesired reaction occurs, and passing said mixed stream into said now stand-by first reactor, thus using the same in a series operation during a period of time when it normally would have been idle on stand-by.

3. A method according to claim 1 wherein hydrogen is obtained from said low-end point hydrocarbon reforming zone and said hydrogen is admixed with said hydrogenated effluent and with said benzene-containing fraction prior to passing the thus-obtained final admixture into and through said hydrogenation zone and wherein the final admixture thus obtained is passed into and through said hydrogenation zone under conditions to cause hydrogenation of hydrogenatable material therein.

4. A method according to claim 1 wherein said second hydrogenation zone normally would be on stand-by and not in operation while said benzene-containing overhead is being hydrogenated but is now used in series with a zone in which said benzene-containing overhead is hydrogenated.

References Cited in the file of this patent

UNITED STATES PATENTS

| | | |
|---|---|---|
| 2,206,200 | Ocon | July 2, 1940 |
| 2,303,075 | Frey | Nov. 24, 1942 |
| 2,878,179 | Hennig | Mar. 17, 1959 |
| 2,952,611 | Haxton et al. | Sept. 13, 1960 |
| 2,977,288 | Cabbage | Mar. 28, 1961 |
| 3,000,809 | Ridgway et al. | Sept. 19, 1961 |
| 3,009,002 | Kron | Nov. 14, 1961 |